US012300916B2

(12) United States Patent
Fu et al.

(10) Patent No.: US 12,300,916 B2
(45) Date of Patent: May 13, 2025

(54) ELECTRICAL CONNECTOR ASSEMBLY HAVING IMPROVED LOCKING ELEMENTS

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Shan-Ling Fu, Kunshan (CN); Hou-Quan Liu, Kunshan (CN); Xiao-Juan Lin, Kunshan (CN); Chun-Hsiung Hsu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 392 days.

(21) Appl. No.: 17/826,646

(22) Filed: May 27, 2022

(65) Prior Publication Data

US 2023/0118936 A1 Apr. 20, 2023

Related U.S. Application Data

(63) Continuation-in-part of application No. 17/702,020, filed on Mar. 23, 2022.

(30) Foreign Application Priority Data

Oct. 16, 2021 (CN) ......................... 202111206279.5

(51) Int. Cl.
*H01R 12/51* (2011.01)
*H01R 12/70* (2011.01)
(Continued)

(52) U.S. Cl.
CPC ....... *H01R 12/515* (2013.01); *H01R 12/7023* (2013.01); *H01R 13/08* (2013.01);
(Continued)

(58) Field of Classification Search
CPC .. H01R 12/515; H01R 12/7023; H01R 13/08; H01R 13/502; H01R 13/6273;
(Continued)

(56) References Cited

U.S. PATENT DOCUMENTS 8,961,236 B2 * 2/2015 Lu ...................... H01R 13/6485 439/660
9,240,653 B2 1/2016 Urano et al.
(Continued)

FOREIGN PATENT DOCUMENTS

CN 213753128 U 7/2021

*Primary Examiner* — Gary F Paumen
(74) *Attorney, Agent, or Firm* — Ming Chieh Chang

(57) ABSTRACT

A board connector includes a first housing including a base and two sidewalls, plural first terminals retained in the base and located between the two sidewalls, and a first metallic shell enclosing the first housing and including a pair of first engaging portions at the sidewalls and a pair of first locking portions located in front of the sidewalls. A cable connector includes a second insulating housing and defining two opposite sides, plural second terminals retained in the second housing, and a second metallic shell enclosing the second housing and including a pair of second locking portions and a pair of second engaging portions behind the second locking portions. The first locking portions are locked with the second engaging portion, and the second locking portion are locked with the first engaging portions after the board connector and the cable connector is mated with each other.

12 Claims, 10 Drawing Sheets

(51) Int. Cl.

| | |
|---|---|
| ***H01R 13/08*** | (2006.01) |
| ***H01R 13/502*** | (2006.01) |
| ***H01R 13/627*** | (2006.01) |
| ***H01R 13/629*** | (2006.01) |
| ***H01R 13/639*** | (2006.01) |
| *H01R 107/00* | (2006.01) |

(52) U.S. Cl.
CPC ....... *H01R 13/502* (2013.01); *H01R 13/6273* (2013.01); *H01R 13/629* (2013.01); *H01R 13/639* (2013.01); *H01R 2107/00* (2013.01)

(58) Field of Classification Search
CPC ................ H01R 13/629; H01R 13/639; H01R 13/6582; H01R 2107/00
USPC .................... 439/607.35, 607.36, 607.4, 346
See application file for complete search history.

(56) References Cited

U.S. PATENT DOCUMENTS

| | | | | |
|---|---|---|---|---|
| 9,748,677 | B2 | 8/2017 | Urano et al. | |
| 10,907,816 | B2 | 2/2021 | Kato et al. | |
| 2006/0234530 | A1* | 10/2006 | Chung | H05K 3/341<br>439/79 |
| 2011/0250779 | A1* | 10/2011 | Howard | H01R 13/639<br>439/346 |
| 2018/0040977 | A1 | 2/2018 | Zhao et al. | |
| 2020/0403355 | A1 | 12/2020 | Zhu et al. | |

* cited by examiner

ELECTRICAL CONNECTOR ASSEMBLY HAVING IMPROVED LOCKING ELEMENTS

CROSS REFERENCE TO RELATED APPLICATIONS

This application is a continuation-in-part of co-pending application Ser. No. 17/702,020, filed Mar. 23, 2022, the contents of which are incorporated entirely herein by reference.

BACKGROUND OF THE INVENTION

1. Field of the Invention

The present invention relates to an electrical connector assembly including a board connector and a cable connector mating with each other.

2. Description of Related Arts

US20180040977A1 discloses an electrical connector assembly including a board connector and a cable connector mating with each other. The board connector includes an insulating housing and conductive terminals retained in the housing, the housing includes a rear wall or base and two sidewalls extending forward from the base, commonly defining a receiving space opening forwards and upwards, the terminals are retained in the base and protrude into the receiving cavity. Each sidewall is provided with an elastic locking arm, which unitarily extends from the sidewall resulting in increasing the complexity of manufacture.

Therefore, an improved electrical connector assembly is desired to overcome the disadvantages of the prior arts.

SUMMARY OF THE INVENTION

An object of the present invention is to provide an electrical connector assembly, a board connector and a cable connector with improved locking elements.

In order to achieve above-mentioned object, an electrical connector assembly comprises a board connector and a cable connector adapted for mating with the board connector. The board connector comprises a first housing comprising a base and two sidewalls extending forward from the base, and a plurality of first terminals retained in the base and located between the two sidewalls and a first metallic shell enclosing the first housing and comprising a pair of first engaging portions at the sidewalls and a pair of first locking portions located in front of the sidewalls. The cable connector comprises a second insulating housing and defining two opposite sides, a plurality of second terminals retained in the second housing; and a second metallic shell enclosing the second housing and comprising a pair of second locking portions and a pair of second engaging portions behind the second locking portions. The first locking portions are locked with the second engaging portion, and the second locking portion are locked with the first engaging portions after the board connector and the cable connector is mated with each other.

Other objects, advantages and novel features of the present invention will become more apparent from the following detailed description of the present embodiment when taken in conjunction with the accompanying drawings.

DETAILED DESCRIPTION OF THE PREFERRED EMBODIMENTS

Figure 1:
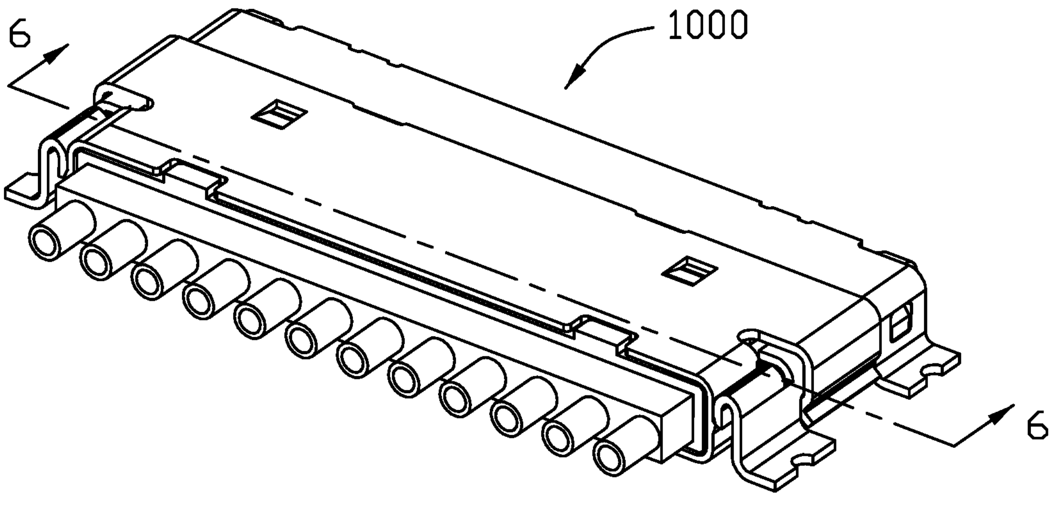
FIG. 1 is a perspective view of an electrical connector assembly including a board connector and a cable connector mating with each other in accordance with a first embodiment of the present invention.
Figure 2:
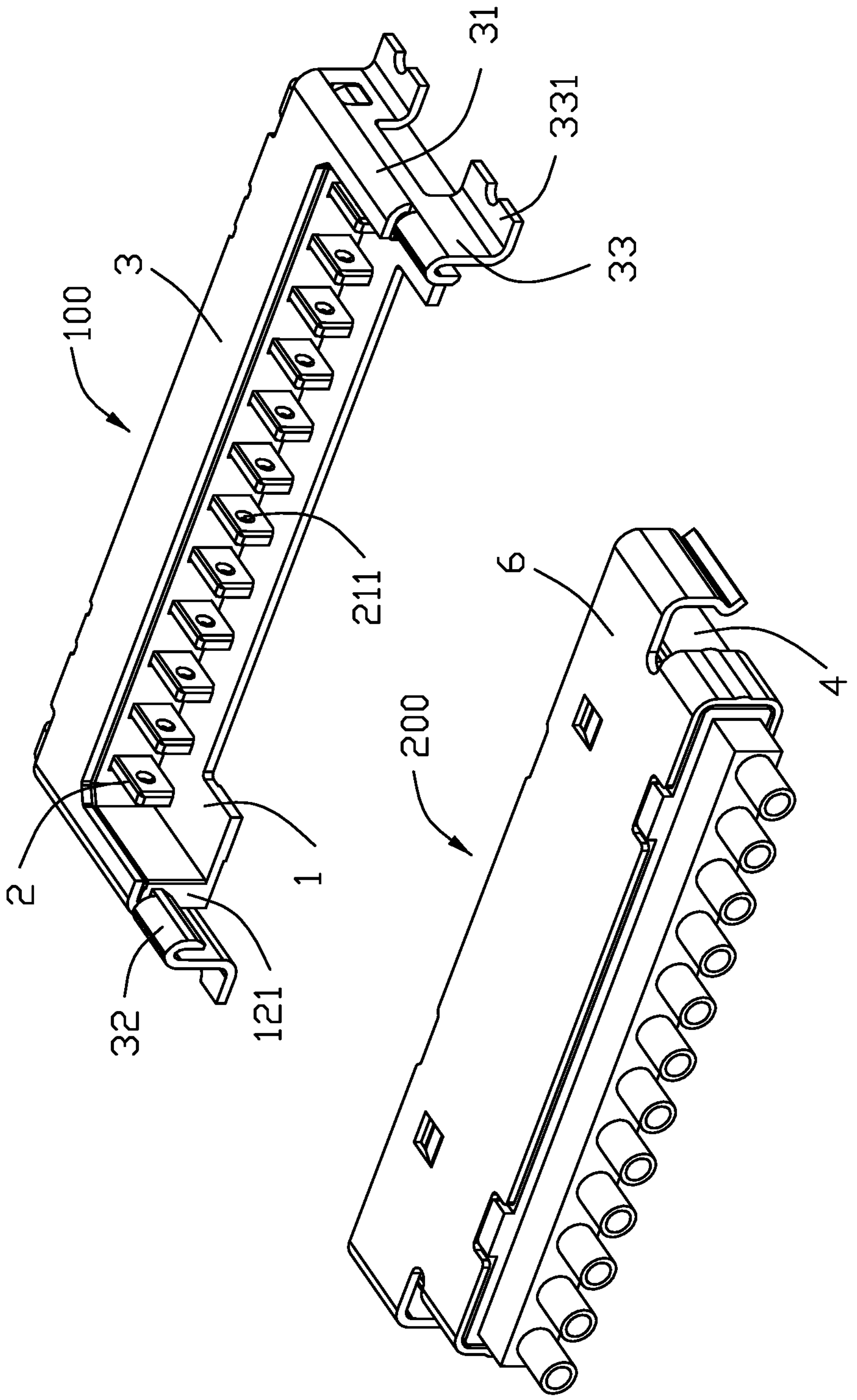
FIG. 2 is another perspective view of the electrical connector assembly in FIG. 1, wherein the board connector and the cable connector are disconnected from each other.
Figure 3:
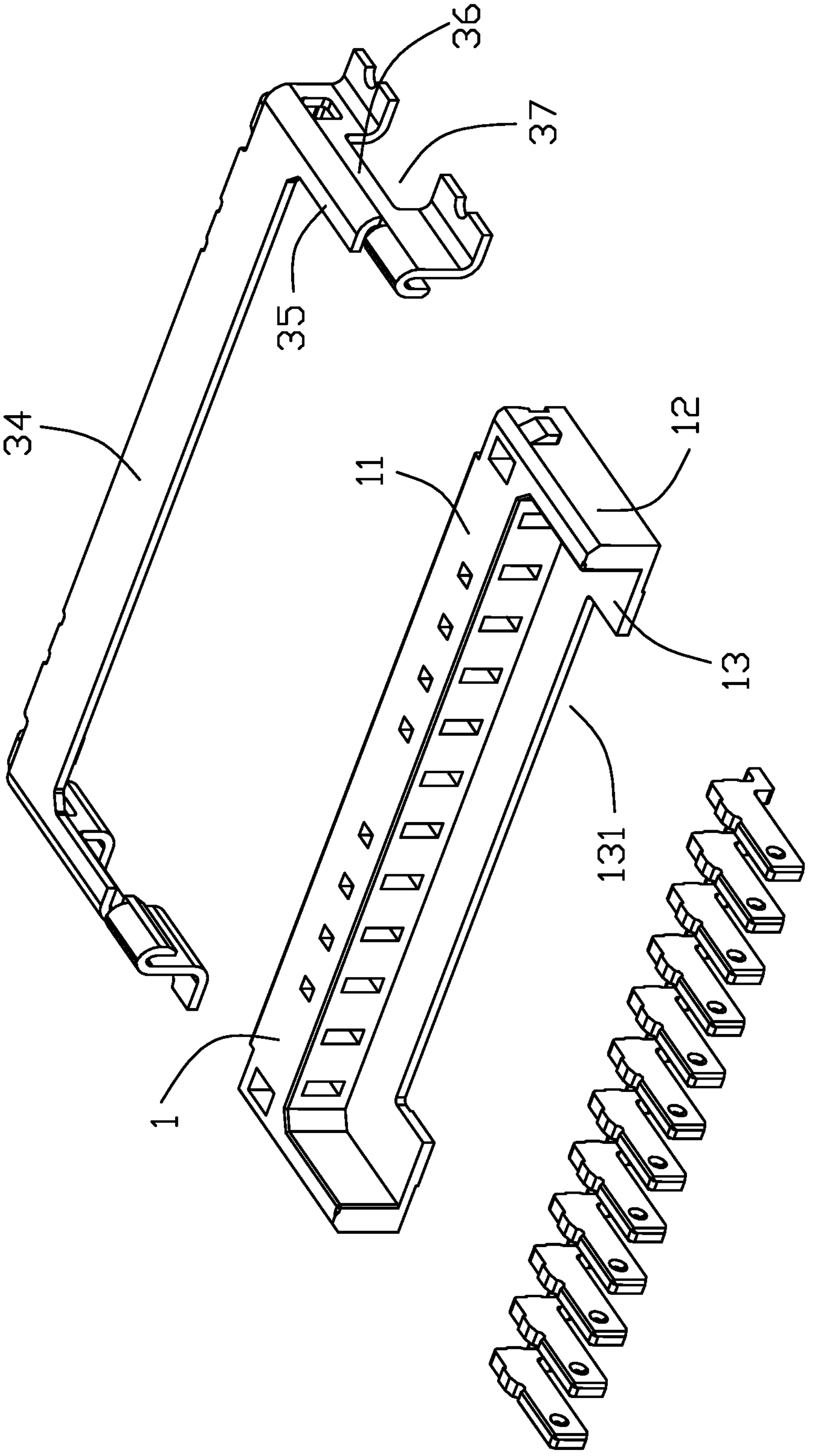
FIG. 3 is an exploded perspective view of the board connector of FIG. 2.
Figure 4:
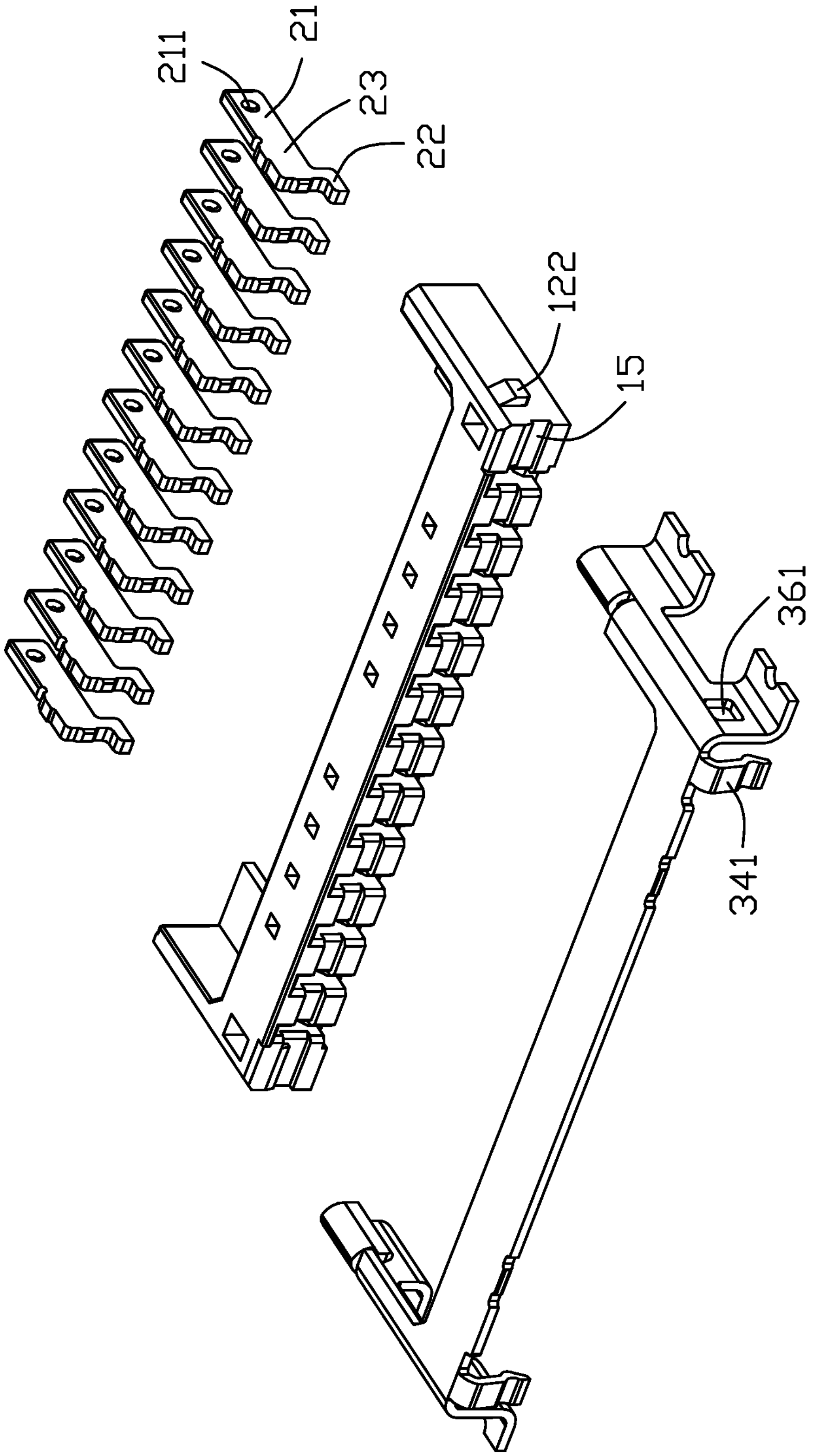
FIG. 4 is another perspective view of the board connector assembly in FIG. 3.
Figure 5:
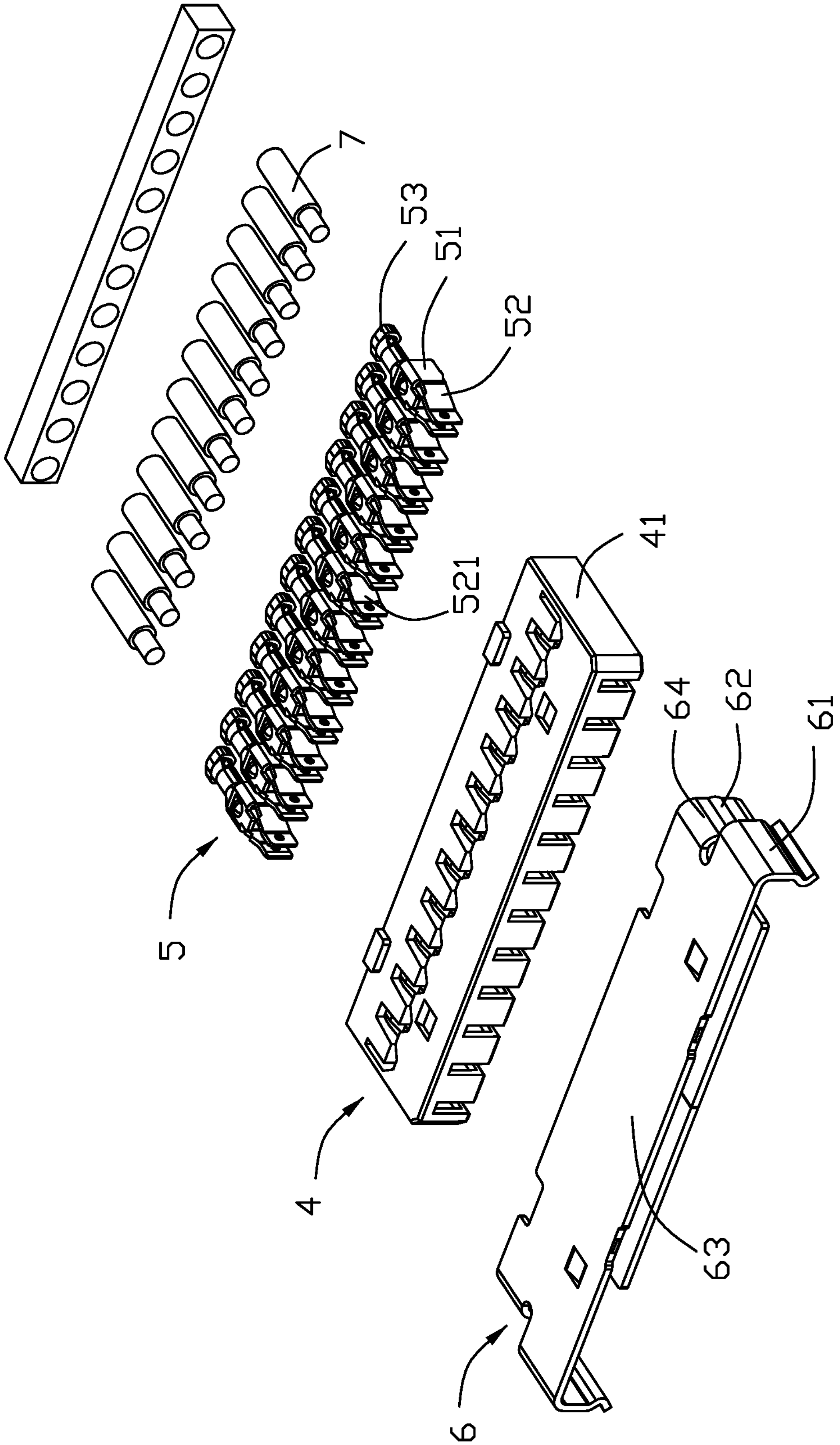
FIG. 5 is an exploded perspective view of the cable connector in FIG. 2.
Figure 6:
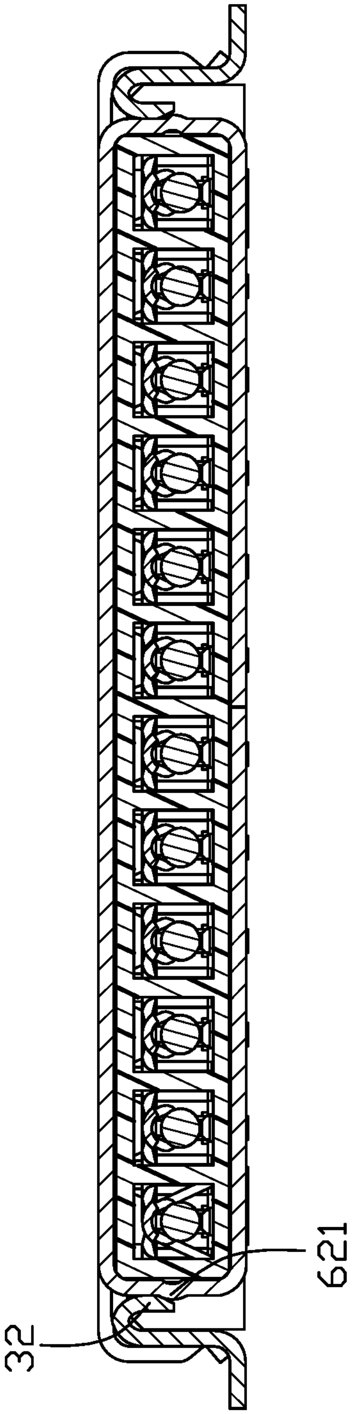
FIG. 6 is a cross sectional view of the electrical connector assembly taken along line 6-6 in FIG. 1.

Reference will now be made to the drawing figures to describe the preferred embodiment of the present invention in detail.

Referring to FIGS. 1-10 illustrating an electrical connector assembly 1000, the assembly 1000 includes a board connector 100 and a cable connector 200 mating with each other. Referring to FIGS. 1-6 illustrating a first embodiment, the board connector 200 includes a first housing 1, a plurality of first terminals 2 and a first metallic shell 3. The first housing 1 includes a rear wall or a base 11 and two sidewalls 12 located at opposite ends of the base 11 along a lateral direction, the base and sidewalls commonly defines a receiving space thereamong. The first terminals 2 are retained in the base 11 and located between the two sidewalls 12, each first terminals extends in the front and rear direction. The first metallic shell 3 includes a pair of first engaging portions 31 fitly covering the sidewalls 12 and a pair of first locking portion 32 located in front of the a front face 121 of the sidewalls 12.

The cable connector 200 includes a second housing 4, a plurality of second terminals 5 and a second shell 6 fitly enclosing the second housing 4. The second terminals 5 are retained in the second housing 4. The second shell 6 fitly encloses the second housing 4. The second housing 4 defines two outsides 41 along the longitudinal direction. The second metallic shell 6 includes a pair of second locking portions 61 and a pair of second engaging portions 62 at opposite lateral ends of the second housing 4, the second locking portions 61 separate from the outsides 41 of the second housing 40 with a gap, the second engaging portions 62 fitly cover the outsides 41 of the second housing 40 and are located behind the second locking portions 61.

When the two connectors are connected with each other, the second locking portions 61 are locked with the first engaging portions 31, and the first locking portions 32 are locked with the second engaging portions 62, thereby resulting in a double locking performance between the two connectors and ensure a more stable engagement between the two connectors.

The first metallic shell 3 includes a connecting portion 33 extending forwards from the first engaging portion 31, and the first locking portion 32 bending inwards from a top edge of the connecting portion 33 and a soldering portion 331 extending outwards from the lower edge of the connecting portion 33. The first metallic shell 3 includes a main top plate 34 covering the top of the base 11, two side top plates 35 covering the tops of the sidewalls 12, and two side plates 36 covering the sides of the sidewalls 12. The side plate 36 defines a locking opening 37 which is functioned as the first engaging portion 31, a front portion of the side plate 36 located in front of the opening 37 forms the connecting portions 33. Two soldering portions 331 bend outward from the side plate and the locking notch is located between the two soldering portions. As shown, the side plate 36 includes a rear portion defining the locking notch 37 and a rear portion defining the first locking portion 31, so that the side plate provide two locking elements.

The first housing 1 defines a retaining lump 122 from the outside of the sidewall 12. The side plate 36 defines a retaining hole 361 retained with the retaining lump 122. The main top plate 34 defines a pair of elastic arms 341 bending downward therefrom, the first housing defines recesses 15, the elastic arms 341 abut against the recesses 15.

The first terminals 2 are of a blade shape, which includes a first contacting portion 21, a first leg portion 22 and a first middle portion 23 joining the first contacting portion 21 and the first leg portions 22. The second contact 5 includes a retaining portion 51, a pair of contacting arms 52 extending from the retaining portion 51 and a connecting portion 53 extending from the retaining portion 53 for connecting with the cables 7 of the cable connector. The first contacting portion 21 defines a concave portion 211 at each side thereof. The contacting arm 52 defines a convex portion 521 for engaging with the concave portion 211 defined on the first contacting portion 21.

The first housing 1 defines a bottom wall 13 extending between and connecting with the sidewalls 12 and the base 11, the bottom wall 13 defines a large notch 131 in front of the first contacting portions 21. In a front to rear direction view, the connecting portions 33 and the first locking portions 32 commonly forms an inverse-U shape structure.

The second metallic shell 6 comprises a top plate 63 and side plates 64, the second locking portions 61 bend downward from the lateral edges from the top plate. The rib 621 projects from the side plate 64. The second locking portions 61 are in a form of elastic arms with a locking head, which separates from the outsides 41 of the second housing 4. The second engaging portion 62 defines a horizontal locking rib 621 extending in a front and rear direction. During a mating process of the two connectors, the cable connector 200 is inserted into the board connector 100 along an upright direction, the rib 621 move downward until the rib 621 is below the first locking portions 32 and blocked by the first locking portion 32 upward. At the same time, the first locking portions 32 are locked with the locking notch 37, thereby resulting in double locking features. The lower edges of the first locking portions 32 are located between the first contacting portions 21 and the bottom walls 13 in the upright direction.

Figure 7:
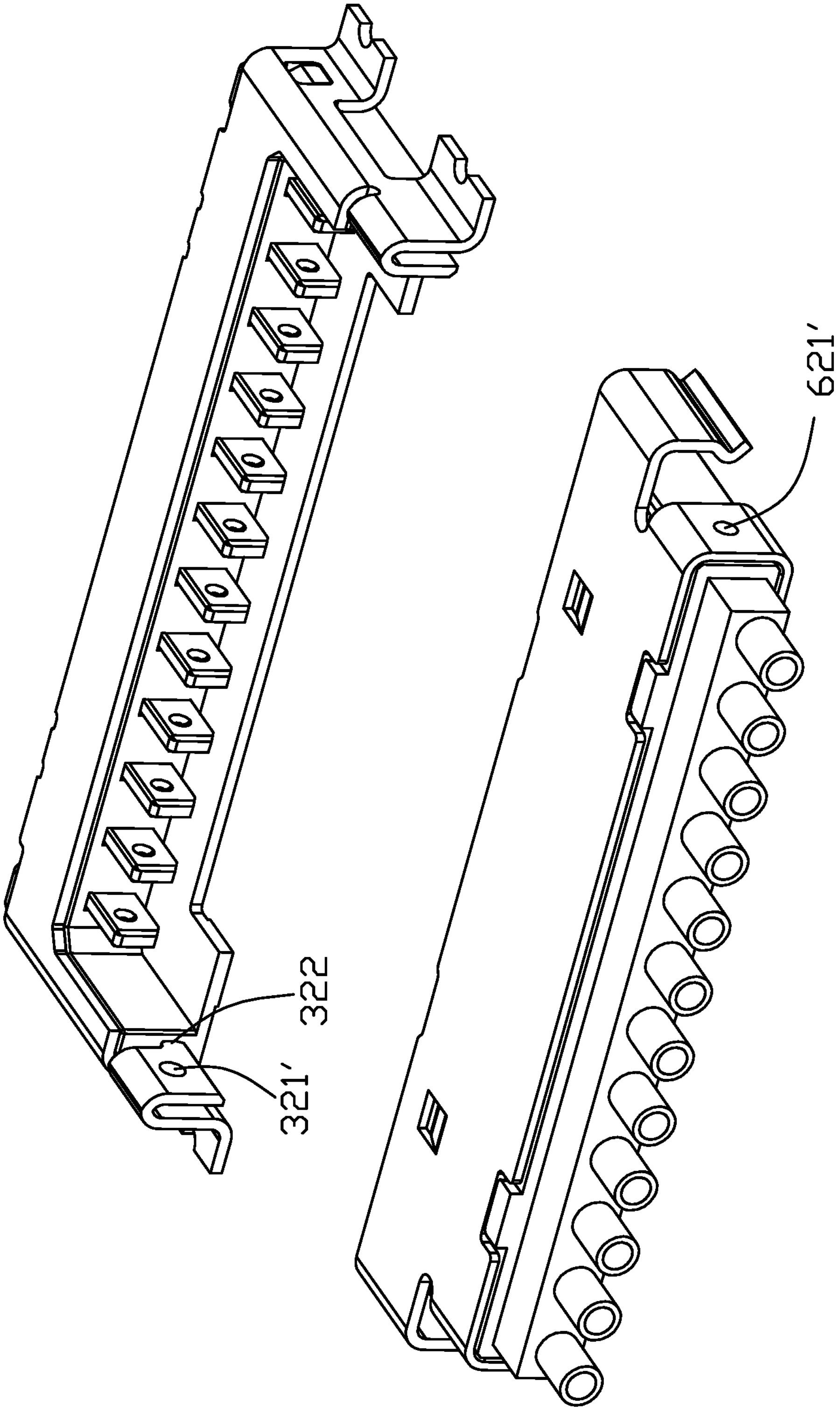
FIG. 7 is a perspective view of an electrical connector assembly according to a second embodiment of this present invention.
Figure 8:
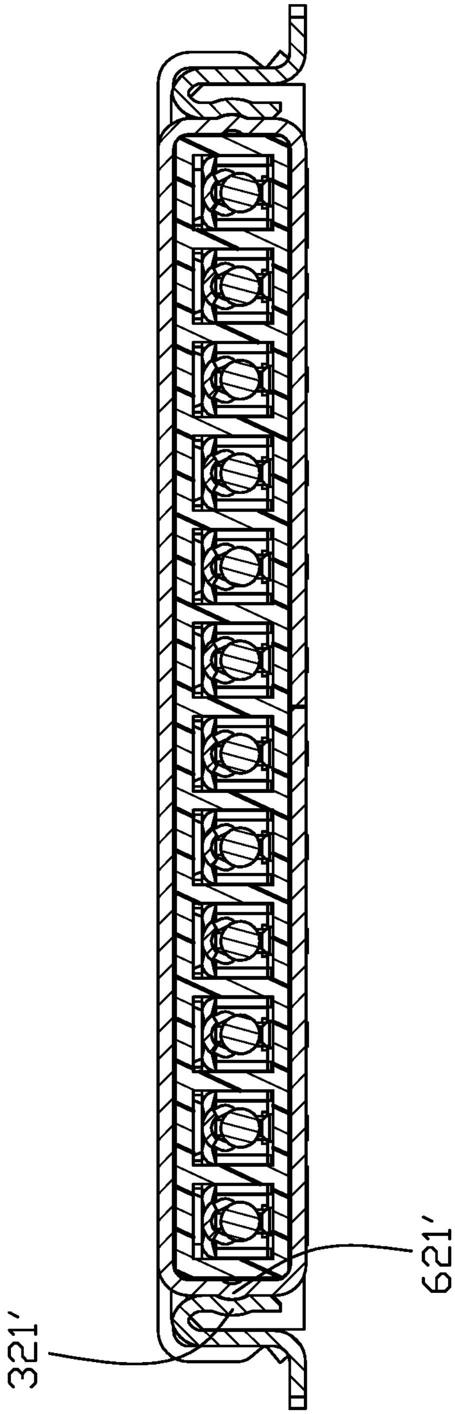
FIG. 8 is a cross sectional view of the electrical connector assembly of FIG. 7.

FIGS. 7-10 illustrate a second embodiment and a third embodiment which two have different some constructs on the first locking member and the second engaging portion. As shown in FIGS. 7-8, the first locking portion 32 define a locking recess 321', the second engaging portion 62 defines a locking bulge 621' which will lock with the locking recess 321. The locking bulge 621' is of a half-sphere construe. An abutting portion 322 extends rearward from the first locking portion 32 abuts against the front face 121 of the sidewall 12.

Figure 9:
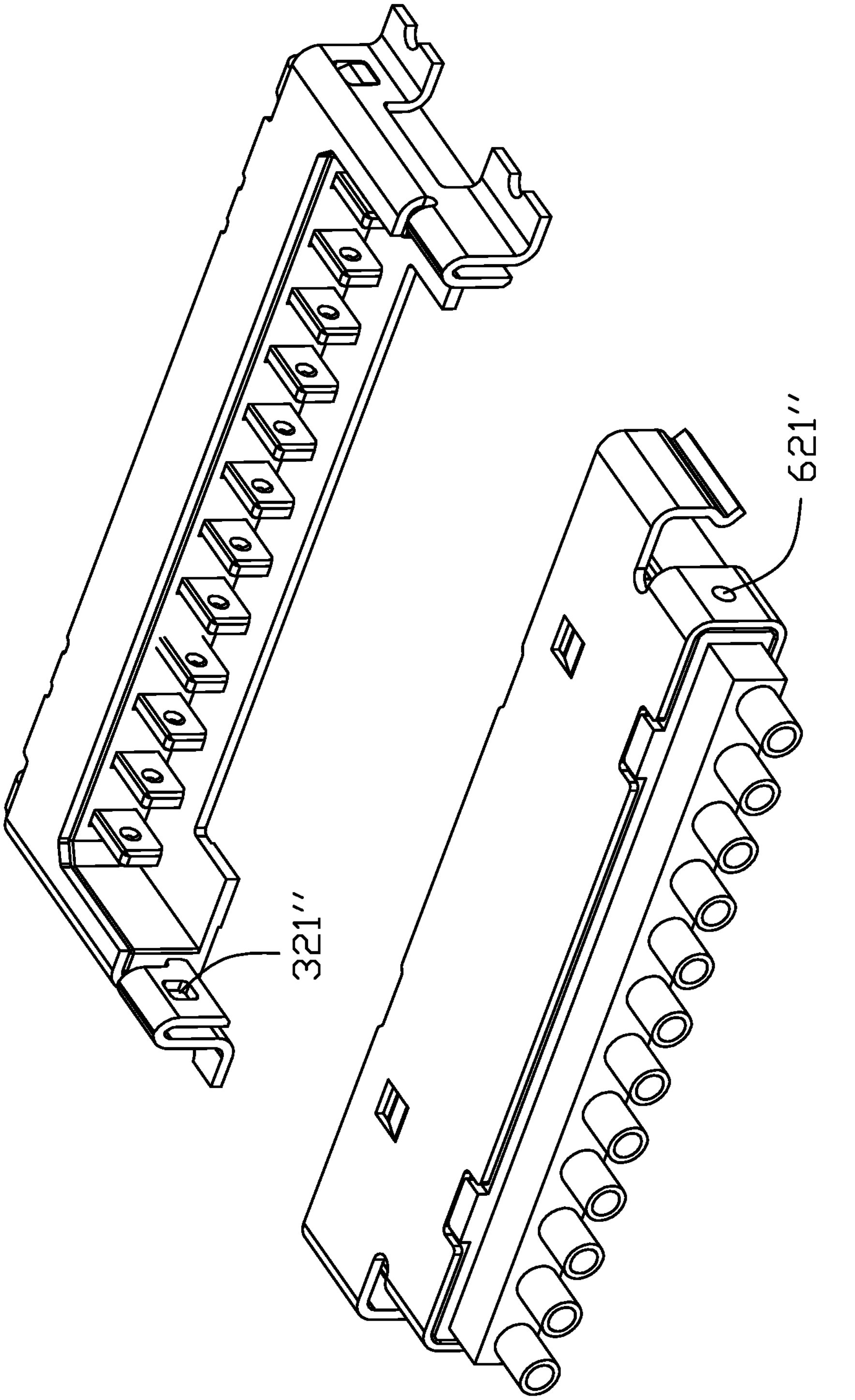
FIG. 9 is a perspective view of an electrical connector assembly according to a third embodiment of this present invention.
Figure 10:
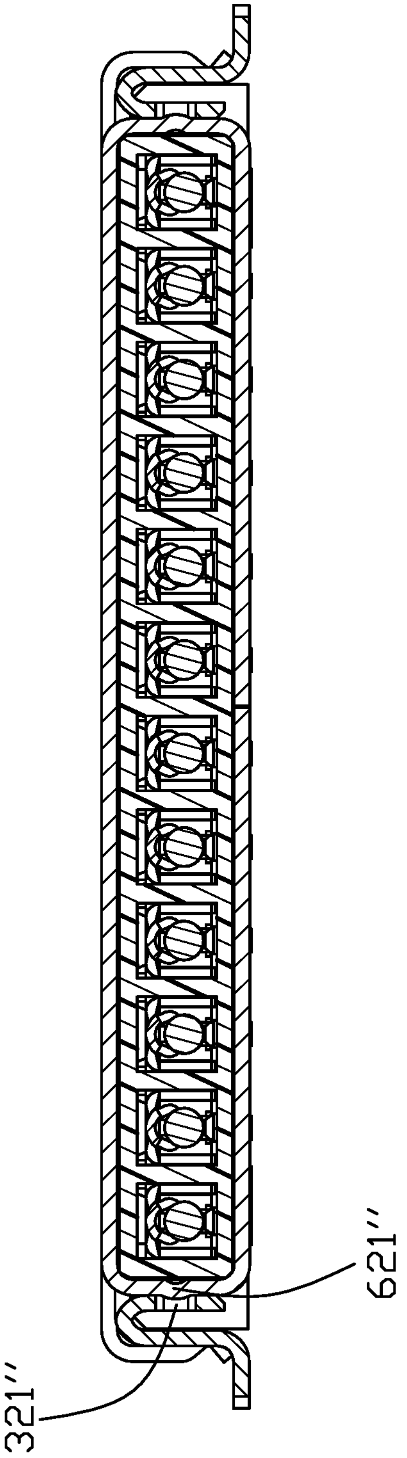
FIG. 10 is a cross sectional view of the electrical connector assembly of FIG. 9.

As shown in FIGS. 9-10, the locking recess 321" is a square through hole along the longitudinal direction, which is locked with the locking bulge 621". The bottom edges of the first locking portion 321', 321" is located between the first contacting portions 21 and the bottom wall 13. As shown above, the locking rib 621, the locking bugle 621', 621" are in the form of a projecting portion, which is locked with the first locking portion 32.

However, the disclosure is illustrative only, changes may be made in detail, especially in matter of shape, size, and arrangement of parts within the principles of the invention.

What is claimed is:

1. An electrical connector assembly comprising:
a board connector comprising:
a first housing comprising a base and two sidewalls extending forward from the base; and
a plurality of first terminals retained in the base and located between the two sidewalls; and
a first metallic shell enclosing the first housing and comprising a pair of first engaging portions at the sidewalls and a pair of first locking portions located in front of the sidewalls; and
a cable connector adapted for mating with the board connector, the cable connector comprising:
a second housing defining two opposite sides;
a plurality of second terminals retained in the second housing; and
a second metallic shell enclosing the second housing and comprising a pair of second locking portions and a pair of second engaging portions behind the second locking portions;
wherein the first locking portions are locked with the second engaging portions and the second locking portions are locked with the first engaging portions after the board connector and the cable connector are mated with each other.

2. The electrical connector assembly as claimed in claim 1, wherein each second locking portion defines an elastic locking arm separating from the side of the second housing, and each first engaging portion defines a locking notch defined on the first metallic shell for locking with the elastic locking arm.

3. The electrical connector assembly as claimed in claim 1, wherein each first locking portion bends downward from the first metallic shell and each second engaging portion defines a locking rib extending in a front and rear direction.

4. The electrical connector assembly as claimed in claim 1, wherein each first locking portion bends downward from the first metallic shell and defines a concave portion and each second engaging portion defines a convex portion to receive the concave portion.

5. The electrical connector assembly as claimed in claim 1, wherein the first metallic shell comprises a top plate fitly covering top faces of the base and two side plates fitly covering the outsides of the sidewalls, each side plate defines a locking notch which functions as one of the first engaging portions, and each first locking portion bends downward from a top edge of a front part of a corresponding side plate.

6. The electrical connector assembly as claimed in claim 5, wherein two soldering legs extend from each side plate.

7. The electrical connector assembly as claimed in claim 5, wherein a pair of elastic arms extend from a rear edge of the top plate and abut against a pair of recesses defined on a rear face of the first housing.

8. The electrical connector assembly as claimed in claim 1, wherein the first housing comprises a bottom wall extending between the base and the two sidewalls, the bottom wall defines a notch, and the first terminals are located behind the notch.

9. The electrical connector assembly as claimed in claim 1, wherein each first terminal defines a concave portion at each of two sides of a contacting portion thereof.

10. A cable connector comprising:

a housing;

a plurality of terminals retained in the housing and arranged in a lateral direction; and a second metallic shell fitly covering the housing;

wherein the metallic shell comprises a pair of locking portions and a pair of engaging portions located behind the locking portions at two opposite lateral sides of the housing; and wherein the metallic shell comprises a top plate and a pair of side plates covering a top and the two opposite lateral sides of the housing respectively, each locking portion extends from a corresponding one of two lateral edges of the top plate and separates from a corresponding lateral side of the housing with a gap, and each engaging portion projects outward from a corresponding side plate.

11. The cable connector as claimed in claim 10, wherein each engaging portion comprises a horizontal rib extending in a front and rear direction.

12. The cable connector as claimed in claim 10, wherein each engaging portion comprises a half-sphere convex portion.

* * * * *